US007016965B2

(12) United States Patent
Gambino

(10) Patent No.: US 7,016,965 B2
(45) Date of Patent: *Mar. 21, 2006

(54) SYSTEM AND METHOD FOR ASYNCHRONOUSLY READING DATA ACROSS SECURE SOCKETS LAYER SESSIONS

(75) Inventor: Mark R. Gambino, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 881 days.

This patent is subject to a terminal disclaimer.

(21) Appl. No.: 10/013,740

(22) Filed: Nov. 13, 2001

(65) Prior Publication Data
US 2003/0093573 A1    May 15, 2003

(51) Int. Cl.
G06F 15/16    (2006.01)
(52) U.S. Cl. ................................. 709/229; 709/203
(58) Field of Classification Search ............... 709/203, 709/229; 719/328; 713/151–153
See application file for complete search history.

(56) References Cited

U.S. PATENT DOCUMENTS

| | | | |
|---|---|---|---|
| 4,912,628 A | 3/1990 | Briggs | |
| 5,537,417 A | 7/1996 | Sharma et al. | |
| 5,539,885 A | 7/1996 | Ono et al. | |
| 5,590,281 A | 12/1996 | Stevens | |
| 5,619,650 A | 4/1997 | Bach et al. | |
| 5,652,885 A | 7/1997 | Reed et al. | |
| 5,657,390 A * | 8/1997 | Elgamal et al. | ............. 713/151 |
| 5,757,925 A * | 5/1998 | Faybishenko | ............... 709/203 |
| 5,805,823 A | 9/1998 | Seitz | |
| 6,047,324 A | 4/2000 | Ford et al. | |
| 6,049,820 A | 4/2000 | Murphy, Jr. et al. | |
| 6,131,121 A | 10/2000 | Mattaway et al. | |
| 6,212,573 B1 | 4/2001 | Lim et al. | |
| 6,223,207 B1 | 4/2001 | Lucovsky et al. | |
| 6,223,287 B1 * | 4/2001 | Douglas et al. | ............. 713/178 |
| 6,370,552 B1 * | 4/2002 | Bloomfield | ................. 715/513 |
| 6,766,333 B1 * | 7/2004 | Wu et al. | .................... 707/201 |
| 6,766,454 B1 * | 7/2004 | Riggins | ..................... 713/185 |
| 6,912,653 B1 * | 6/2005 | Gohl | .......................... 713/155 |
| 2002/0071562 A1 * | 6/2002 | Parenty | ..................... 380/278 |
| 2002/0099942 A1 * | 7/2002 | Gohl | .......................... 713/169 |
| 2002/0199007 A1 * | 12/2002 | Clayton et al. | ............. 709/230 |
| 2003/0145094 A1 * | 7/2003 | Staamann et al. | .......... 709/229 |
| 2003/0160815 A1 * | 8/2003 | Muschetto | ................... 345/733 |
| 2003/0167403 A1 * | 9/2003 | Mccurley et al. | ........... 713/201 |
| 2004/0003276 A1 * | 1/2004 | Kouznetsov et al. | ........ 713/200 |
| 2004/0010703 A1 * | 1/2004 | Kouznetsov et al. | ........ 713/200 |

* cited by examiner

Primary Examiner—William C. Vaughn, Jr.
(74) Attorney, Agent, or Firm—Eugene I. Shkurko; Cantor Colburn LLP

(57) ABSTRACT

A system and method for asynchronously reading data across secure sockets layer (SSL) sessions, comprising: an SSL session receiving a request from a first application process for an asynchronous reading of data across the SSL session wherein the request specifies a second application program to be executed upon the receiving of data from an Internet protocol network; the SSL session passing the request to TCP/IP; TCP/IP receiving data from an Internet protocol network; TCP/IP executing the second application program as a new process; TCP/IP passing the received data to the SSL session; and the SSL session passing the received data to the second application process.

7 Claims, 2 Drawing Sheets

SYSTEM AND METHOD FOR ASYNCHRONOUSLY READING DATA ACROSS SECURE SOCKETS LAYER SESSIONS

FIELD OF THE INVENTION

This invention relates to secure data communications and more specifically to the asynchronous reading of data across secure sockets layer sessions.

BACKGROUND OF THE INVENTION

A computer program being executed on a computer is known as a computer process and may simply be referred to as a process. Processes require mechanisms for exchanging data among them. These mechanisms are known as inter process communications mechanisms (IPCs). One category of IPC, known as sockets, was initially developed in the early 1980s at the university of California at Berkeley for use with computer systems utilizing the UNIX computer operating system. Sockets technology has since been adopted by many computer software and operating system developers including IBM.

Exponential increases in the use of computer networks and the expansion of public networks such as the Internet have resulted in a need for secure data communications. In response, Netscape Communications developed a secure IPC mechanism known as Secure Sockets Layer (SSL) (see U.S. Pat. No. 5,657,390). SSL is responsible for authenticating computer systems involved in the exchange of information and for encrypting and decrypting the data they exchange. SSL has been revised on at least two occasions and a derivative implementation, known as Transport Layer Security version 1 ("TLS"), is defined in Internet Engineering Task Force ("IETF") Request for Comments (RFC) 2246.

SSL operates as an intermediary between an application process, such as a web browser, and a TCP/IP stack. TCP/IP is a combination of communications protocols used of route data over a data network and ensure its delivery. When a computer is enabled to transport data using TCP/IP the computer is referred to as having a TCP/IP stack. SSL sessions and SSL enabled processes exchange information messages using a predetermined message format known as SSL Application Programming Interface ("API"). The messages exchanged are referred to as API calls. Where several instances of SSL are simultaneously executed on a computer, each instance of SSL is referred to as an SSL session.

Because an SSL session is generally tied to the application process that requested its services and terminating an application process terminates the corresponding SSL session, individual processes requiring SSL services must initiate separate SSL sessions. Current SSL implementations generally require that an application process remain un-terminated until its SSL session has completed communications. As a consequence, available computer resources must be sufficient to maintain all un-terminated processes regardless of whether or not those processes are involved in active communications. Computer resources include processor time, volatile and non-volatile memory, and data throughput bandwidth.

In addition, SSL sessions encounter delays in receiving responses from computers with which they have been directed to communicate. These delays further extend the time application processes must continue executing. The result is an excessive drain of computer system resources. As the number of application processes, SSL sessions, and response delays grow, so does the danger of a computer system failing due to the depletion of available computer resources. These circumstances are often encountered in high-volume distributed computing environments including those with high numbers of concurrent transactions such as credit card transaction authorization systems. The possibility of computer system failure is heightened further where individual applications utilize multiple requesting processes or where computer systems execute multiple applications concurrently. While such concerns may be combated by strategies such as increasing overall data throughput at the TCP/IP transport level or increasing available computer resources, the present invention provides a solution that allows for the asynchronous reading of data across secure sockets layer (SSL) sessions and makes more efficient use of existing computer resources.

SUMMARY OF THE INVENTION

A system and method for asynchronously reading data across secure sockets layer (SSL) sessions, comprising: an SSL session receiving a request from a first application process for an asynchronous reading of data across the SSL session wherein the request specifies a second application process to be executed upon the receiving of data from an Internet protocol network; the SSL session passing the request to TCP/IP; TCP/IP receiving data from an Internet protocol network; TCP/IP executing the second application program as a new process; TCP/IP passing the received data to the SSL session; and the SSL session passing the received data to the second application process.

DETAILED EMBODIMENT OF THE INVENTION

Figure 1:
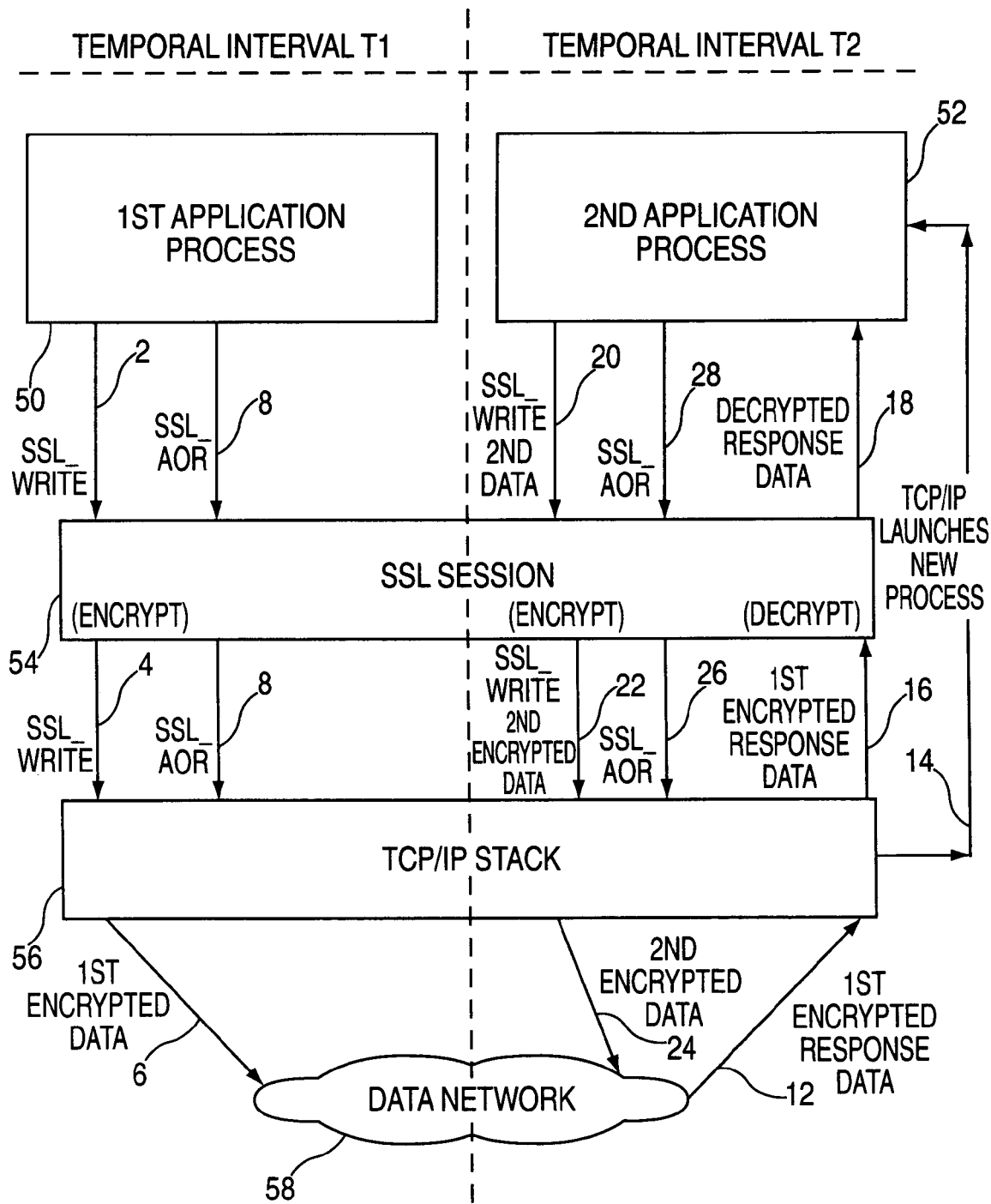
FIG. 1 shows the sending of data via an SSL session during a first temporal interval and the receiving of response data via the same SSL session during a second temporal interval.

Although this exemplary detailed embodiment of the invention suggests the utilization of SSL sessions for secured communications, it is understood by one of ordinary skill in the art that any known alternative secured communications mechanism may be used. Alternative secured communications mechanisms include existing, future, and derivative implementations of SSL such as TLS. If an alternative secure communications mechanism other than SSL is used then application processes and the TCP/IP stacks would communicate using the alternative secure communications mechanism's application programming interface (API) and API calls. Similarly, although this exemplary detailed embodiment of the invention suggests the utilization of TCP/IP for transporting data across a data network, it is understood by one of ordinary skill in the art that any alternative transport protocol may be used. Alternative protocols may also include existing, future, and derivative implementations of TCP/IP.

Asynchronous data communications refers to an uncoordinated exchange of data such as where the sending of data is at a different temporal interval than the receiving of data. The present invention provides a system and method for computer processes to asynchronously read data across SSL sessions. It includes the ability for processes to close after sending data to an SSL session and to open upon the arrival of data from a data network. A result is that computer system resources previously allocated to maintain processes waiting for data to arrive may be re-allocated to maintain additional active processes.

Consequently, the present invention results in the more efficient use of computer systems and a reduction in the wasteful allocation of computer resources. It is a further benefit because it allows for the exponential scaling-up of the number of concurrent transactions handleable by a given computer system without the costs and logistical complexities that normally accompany the otherwise necessary modifications to a computer system. Another aspect of the invention is to compliment a computer operating system's existing asynchronous I/O capabilities with application level asynchronous I/O capabilities. Another aspect of the invention is to supplement efficiency enhancements made to TCP/IP, such as increasing TCP/IP maximum throughput, with application level asynchronous I/O capabilities.

In general, an application process directs an SSL session to listen and wait for incoming data from a data network using an SSL_read API call. The present invention supplements the functionality of the SSL_read API by introducing a new SSL API call, referred to in this exemplary embodiment as SSL_activate_on_receipt ("SSL_AOR"). The SSL_AOR API call includes an input parameter that specifies a second application process as the recipient of data received in response to data sent by the first application process. The first application process terminates prior to the receipt of response data thereby freeing-up computer resources. In addition, the first and second application processes may be either consecutive instances of a single application process or single instances of different application processes.

It is understood that the SSL session and TCP/IP stack are executing and available for use when data is sent by the first application process and that they continue executing and remain available for use after the first application process terminates. Furthermore it is understood that the first application process terminates prior to the execution of the second application process and that neither the first nor the second application process is active while the system is awaiting response data to arrive over the network. Thus, a method of sharing SSL sessions is also to be implemented. Any method of sharing SSL sessions known to one of ordinary skill in the art may be used including kernel-based or operating-system-based shared SSL sessions as well as the shared SSL sessions disclosed in Ser. No. 10/010,992, titled "A system and method sharing secure socket layer sessions across multiple processes", filed concurrently herewith.

FIG. 1 provides an overview of an exemplary embodiment of the present invention and also describes the flow of data during the use of the exemplary embodiment. FIG. 1 is divided into temporal intervals, interval T1 and interval T2. Interval T1 shows a first application process sending first encrypted data over the data network and passing an SSL_AOR API call specifying a second application process as the recipient of data received in response to data sent by the first application process. Interval T2 shows the receipt of first encrypted response data, the execution of the second application process, and the passing of the first encrypted response data to the SSL session and then to the second application process.

Interval T1:

A first application process 50 calls an SSL session 54 and passes data to the SSL session 54 using an SSL_write API call 2. The SSL session 54 receives the SSL_write API call, encrypts the data accompanying the SSL_write API call 2, and passes a socket write API call 4 along with the encrypted data to the TCP/IP stack 56. The TCP/IP stack 56 packages the encrypted data and sends the encrypted data 6 over a data network 58.

The first application process 50 passes an SSL_AOR API call 8 and any accompanying input parameter to the SSL session 54 directing that a second application process 52 is to be executed upon the receipt of data 12 from the data network 58. The first application process 50 terminates, however the SSL session 54 and TCP/IP stack 56 continue executing and remain available for use.

Interval T2:

The TCP/IP stack 56 receives encrypted data 12 from the data network 58. The TCP/IP stack 56 creates 14 the second application program 52 as a new process. The second application process, which may be either a new instance of the first application process or a different application process, and passes control to the SSL session 54. The second application process 52 passes an SSL_read API call 70 to the SSL session 54. The purpose of the SSL_read API call is to retrieve incoming data received by the TCP/IP stack. The SSL session reformats the SSL_read API call into a socket read API call 72 understandable by the TCP/IP stack. The SSL session 54 retrieves the encrypted response data 16 from the TCP/IP stack 56. The SSL session 54 decrypts the received encrypted data and the decrypted data 18 is retrieved from the SSL session 54 by the second application process 52.

The steps of Intervals T1 and T2 maybe repeated as necessary, either concurrently or asynchronously. Interval T2 shows an additional occurrence of the steps of interval T1 described above. A second application process 52 calls an SSL session 54 and passes data to the SSL session 54 using an SSL_write API call 20. The SSL session 54 receives the SSL_write API call, encrypts the data accompanying the SSL_write API call 20, and passes a socket write API call 22 along with the encrypted data to the TCP/IP stack 56. The TCP/IP stack 56 packages the encrypted data and sends the encrypted data 24 over the data network 58.

The second application process 52 passes an SSL_AOR API call 26 and an accompanying input parameter to the SSL session 54 directing that a third application process is to be executed upon the SSL session's 54 receipt of data from the data network 58. The second application process 52 terminates, however the SSL session 54 and TCP/IP stack 56 continue executing and remain available for use.

Figure 2:
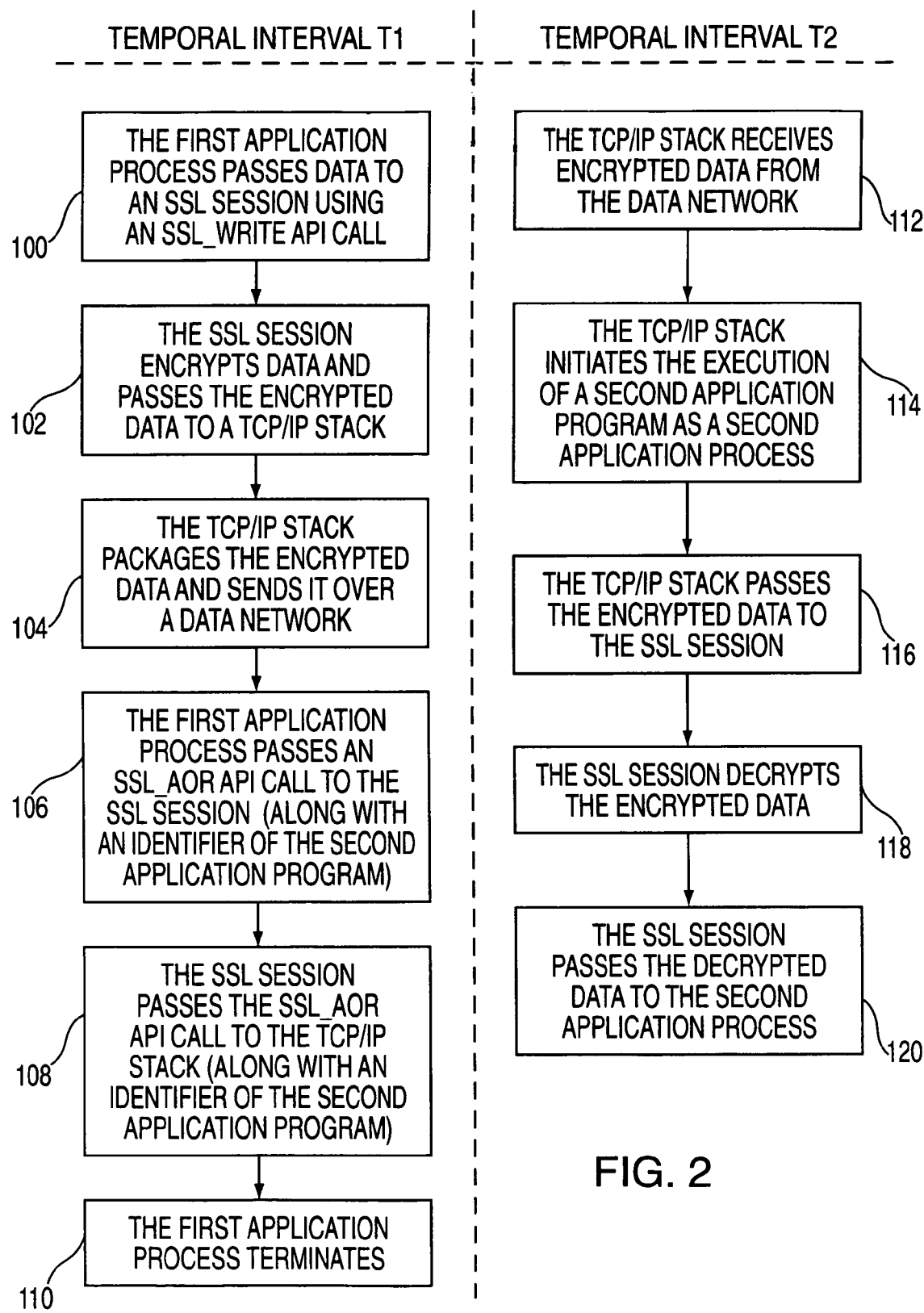
FIG. 2 shows a flow chart describing steps for asynchronously reading of data across secure sockets layer sessions.

FIG. 2 shows a flow chart of the steps for asynchronously reading data across secure socket layer sessions. In FIG. 2, a first application process contacts an SSL session using an SSL_write API call at 100. The SSL session encrypts data passed with the SSL_write API call and passes the encrypted data to TCP/IP using a socket write API call at 102. TCP/IP packages the encrypted data and sends the data over a data network at 104. The first application process passes an SSL_AOR (SSL activate on receipt) API call and an input parameter specifying a second application program to be executed in a new process upon receipt of response data at 106. The SSL session passes the SSL_AOR API call to TCP/IP at 108. The first application process terminates at 110. The TCP/IP stack receives encrypted response data over the data network at 112. The TCP/IP stack initiates the execution of the specified second application program as a new process at 114. The SSL session 54 retrieves the encrypted response data 116 from the TCP/IP stack 54 using a socket read API call. The SSL session decrypts the received encrypted data at 118 and the decrypted data is retrieved by the second application process 120 using the SSL_read API call.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A method for asynchronously reading data across secure communication sessions, comprising:
   a secure communication session receiving a request from a first application process for an asynchronous reading of data across the secure communication session wherein the request specifies a second application program to be executed upon the receiving of data from a data network;
   the secure communication session passing the request to a transport process;
   the transport process receiving data from a data network;
   the transport process initiating the execution of the second application program as a new process;
   the transport process passing the received data to the secure communication session; and
   the secure communication session passing the received data to the second application process;
   wherein the secure communication session communicates with the first application process and the second application process using the secure communication session's application programming interface;
   wherein the secure communication session's application programming interface (API) is appended to include application programming interface (API) calls for sending, receiving, and interpreting requests for asynchronously reading data across secure sessions;
   wherein the appended secure communication session application programming interface calls include an input parameter specifying an application program to be executed upon the receipt of data from the data network.

2. The method of claim 1 wherein secure communication sessions are secure sockets layer (SSL) sessions.

3. The method of claim 1 wherein the transport process is a TCP/IP stack.

4. The method of claim 1 wherein the first application process terminates prior to the initiation of the execution of the second application process.

5. A computer-readable storage medium comprising:
   computer readable program code embodied therein for asynchronously reading data across secure communication sessions, the computer readable program code comprising:
   computer readable program code for causing a computer to generate and pass a request for an asynchronous reading of data across a secure communication session;
   computer readable program code for causing a computer to receive and interpret the request for an asynchronous reading of data across a secure communication session; and computer readable program code for causing a computer to receive data from a data network and for causing a computer to initiate the execution of a computer program in response to the receipt of the data;
   wherein the secure communication session communicates with the first application process and the second application process using the secure communication session's application programming interface;
   wherein the secure communication session's application programming interface (API) is appended to include application programming interface (API) calls for sending, receiving, and interpreting requests for asynchronously reading data across secure sessions;
   wherein the appended secure communication session application programming interface calls include an input parameter specifying an application program to be executed upon the receipt of data from the data network.

6. The computer-readable storage medium of claim 5 wherein secure communication sessions are secure socket layer (SSL) sessions and the data network is an Internet protocol network.

7. The computer-readable storage medium of claim 5 wherein the request includes an identifier specifying a second application program to be executed as a new process.

* * * * *